(12) United States Patent
Stutz et al.

(10) Patent No.: US 9,765,643 B2
(45) Date of Patent: Sep. 19, 2017

(54) BI-DIRECTIONAL AUXILIARY LUBRICATION SYSTEM

(71) Applicant: UNITED TECHNOLOGIES CORPORATION, Farmington, CT (US)

(72) Inventors: Robert C. Stutz, Dobbs Ferry, NY (US); Enzo DiBenedetto, Kensington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 579 days.

(21) Appl. No.: 13/719,688

(22) Filed: Dec. 19, 2012

(65) Prior Publication Data

US 2014/0165530 A1 Jun. 19, 2014

(51) Int. Cl.
*F01D 25/18* (2006.01)
*F16N 29/02* (2006.01)
(Continued)

(52) U.S. Cl.
CPC ............... *F01D 25/18* (2013.01); *F02C 7/06* (2013.01); *F16N 29/02* (2013.01);
(Continued)

(58) Field of Classification Search
CPC . F02C 7/06; F01D 25/18; F01D 25/20; F01D 25/22; F01D 9/065; F16N 2210/02; F16N 7/12; F16N 7/32; F16N 7/40; F16N 2260/00; F16N 2260/60; F16N 29/02; F01M 2005/028; F01M 1/18
(Continued)

(56) References Cited

U.S. PATENT DOCUMENTS 3,857,461 A * 12/1974 Schmitt ............... B62D 55/125
184/6.2
4,153,141 A 5/1979 Methlie
(Continued)

FOREIGN PATENT DOCUMENTS

FR 2457972 A1 12/1980
GB 2225817 A * 6/1990 ............. F01M 11/06

OTHER PUBLICATIONS

International Search Report and Written Opinion for related International Application No. PCT/US2013/070734 report dated Aug. 18, 2014.
English Abstract for FR2457972A1—Dec. 26, 1980; 2 pgs.
European Search Report for Application No. 13870181.8-1603; Date of Mailing: Mar. 10, 2016; 7 pgs.

*Primary Examiner* — Gerald L Sung
*Assistant Examiner* — Alain Chau
(74) *Attorney, Agent, or Firm* — Cantor Colburn LLP

(57) ABSTRACT

A bi-directional auxiliary lubrication system which allows lubricant to be supplied to moving engine components after a loss of lubricant pressure from a main lubricant tank is disclosed. In a gas turbine engine, the lubrication system may siphon compressed air from a compressor to draw lubricant from a reserve lubricant tank and deliver that lubricant to the engine components. The same conduits used by the lubrication during normal operations are utilized in an opposite direction to provide the flow of lubricant from the reserve lubricant tank during such auxiliary or low-lubricant-pressure operations.

11 Claims, 3 Drawing Sheets

(51) Int. Cl.
   *F02C 7/06*    (2006.01)
   *F16N 7/30*    (2006.01)
   *F01M 5/02*    (2006.01)

(52) U.S. Cl.
   CPC .......... *F01M 2005/028* (2013.01); *F16N 7/30* (2013.01); *F16N 2260/00* (2013.01); *Y02T 50/671* (2013.01)

(58) Field of Classification Search
   USPC ................ 60/39.08; 184/6.11, 6.14; 384/473
   See application file for complete search history.

(56) References Cited

U.S. PATENT DOCUMENTS

| | | | |
|---|---|---|---|
| 4,245,465 A | | 1/1981 | Milo |
| 4,284,174 A | * | 8/1981 | Salvana et al. ................ 184/6.4 |
| 4,452,037 A | | 6/1984 | Waddington et al. |
| 5,020,636 A | * | 6/1991 | Daeges ................ F04B 43/095 184/55.1 |
| 5,046,306 A | * | 9/1991 | Borre, Jr. ..................... 60/39.08 |
| 5,494,013 A | * | 2/1996 | Helbig ................... F01M 5/025 123/196 S |
| 5,513,722 A | * | 5/1996 | Foltz ........................ F16N 7/34 184/55.2 |
| 7,174,997 B2 | * | 2/2007 | Sheridan ..................... 184/6.26 |
| 7,387,189 B2 | * | 6/2008 | James et al. ................. 184/6.11 |
| 2008/0006483 A1 | | 1/2008 | Parnin et al. |

* cited by examiner

US 9,765,643 B2

BI-DIRECTIONAL AUXILIARY LUBRICATION SYSTEM

STATEMENT OF GOVERNMENT INTEREST

The United States Government has certain rights in this invention pursuant to contract number 5148262-0302-0343 between the United States Army and United Technologies Corporation.

FIELD OF THE DISCLOSURE

The present disclosure generally relates to gas turbine engines and, more specifically, to lubrication systems for gas turbine engines.

BACKGROUND OF THE DISCLOSURE

Gas turbine engines of modern aircraft require a constant supply of oil to mechanical components such as, but not limited to, bearings to ensure proper operation of the engine. The oil can be used as a lubricant or a coolant for such components. Typical lubrication systems have a separate and redundant back-up or auxiliary system to guaranty a supply of oil to the critical engine components at all times. Such auxiliary lubrication systems are typically operating constantly while the engine is active, which may reduce the performance of the engine during normal operations. Additionally, such auxiliary lubrication systems may require separate pumps and conduits to supply the engine components with the necessary oil. Other auxiliary lubrication systems may not run constantly, but require a processor which can determine that the auxiliary lubrication system is needed and provide for actuation of same. While effective, all such systems add cost to the overall engine, require maintenance, and contribute to the weight of the associated aircraft.

Therefore, it can be seen that a need exists for an auxiliary lubrication system which operates only when needed yet does not require a processor. Additionally, minimizing extra components to create such an auxiliary lubrication system for an aircraft is also needed, as space, weight, and maintenance are important on any aircraft.

SUMMARY OF THE DISCLOSURE

In accordance with one aspect of the disclosure, a lubrication system is disclosed. The lubrication system may include a three-way valve having a first opening, a second opening, and a third opening. A main conduit may be connected to the three-way valve at the first opening and may communicate a lubricant from a main lubricant tank to at least one working component. A reserve lubricant tank may be connected to the three-way valve at the second opening. A working fluid check valve may be connected to the three-way valve at the third opening and may control a flow of a working fluid into the lubrication system.

In a refinement, the working fluid check valve may be a pressure valve biased to a closed position.

In another refinement, the working fluid may be compressed air.

In yet another refinement, the lubrication system may further include a lubricant check valve positioned in the main conduit between the main lubricant tank and the three-way valve.

In a further refinement, the lubricant-check valve may be a pressure valve biased to a closed position.

In yet another refinement, the working component may be a bearing of a gas turbine engine.

In accordance with another aspect of the disclosure, a gas turbine engine including a compressor, a combustor downstream from the compressor, and a turbine downstream from the combustor and connected to the compressor by an engine shaft is disclosed. The gas turbine engine may further include a lubrication system. The lubrication system may have a three-way valve connected to a main lubricant tank at a first opening of the three-way valve by a main conduit. A reserve lubricant tank may be connected to a second opening of the three-way valve and an air-check valve may be connected to a third opening of the three-way valve. The air-check valve may prevent compressed air from entering the three-way valve. The lubrication system may provides a lubricant to engine components via the main conduit.

In a refinement, the air-check valve may be a pressure valve biased to a closed position.

In another refinement, an air conduit may provide a passage for compressed air to flow from the compressor to the air-check valve.

In yet another refinement, the engine may further include a lubricant-check valve positioned in the main conduit between the main lubricant tank and the three-way valve.

In a further refinement, the lubricant-check valve may be a pressure valve biased to a closed position.

In accordance with yet another aspect of the present disclosure, a method of lubricating a component of a gas turbine engine is disclosed. The method may include pumping lubricant in a first direction from a main lubricant tank to the engine component with a lubricant pump and lubricating the engine component with the lubricant from the main lubricant tank during the normal mode of operation. The method may further include reversing lubricant flow direction to a second direction with compressed air from a compressor passing through a three-way valve, drawing lubricant from a reserve lubricant tank with the compressed air by suction, and lubricating the engine component with the lubricant from the reserve lubricant tank during a low-lubricant-pressure mode of operation.

In a refinement, the method may further include opening a lubricant-check valve with the lubricant from the main lubricant tank during the normal mode of operation.

In a further refinement, the method may further include closing the lubricant-check valve with the compressed air during the low-lubricant-pressure mode of operation.

In another refinement, the method may further include closing an air-check valve with the lubricant from the main lubricant tank during the normal mode of operation.

In a further refinement, the method may further include opening the air-check valve with the compressed air before entering the three-way valve during the low-lubricant-pressure mode of operation.

In another refinement, the method may further include creating an air-lubricant mixture by combining the compressed air and the lubricant from the reserve lubricant tank during the low-lubricant-pressure mode of operation.

In yet another refinement, the method may further include circulating the lubricant in the reserve lubricant tank by driving the old lubricant from the reserve lubricant tank with new lubricant from the main lubricant tank during the normal mode of operation.

In yet another refinement, the method may further include switching automatically from the normal mode of operation to the low-lubricant-pressure mode of operation.

In still another refinement, the method may further include switching automatically from the low-lubricant-pressure mode of operation to the normal mode of operation.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
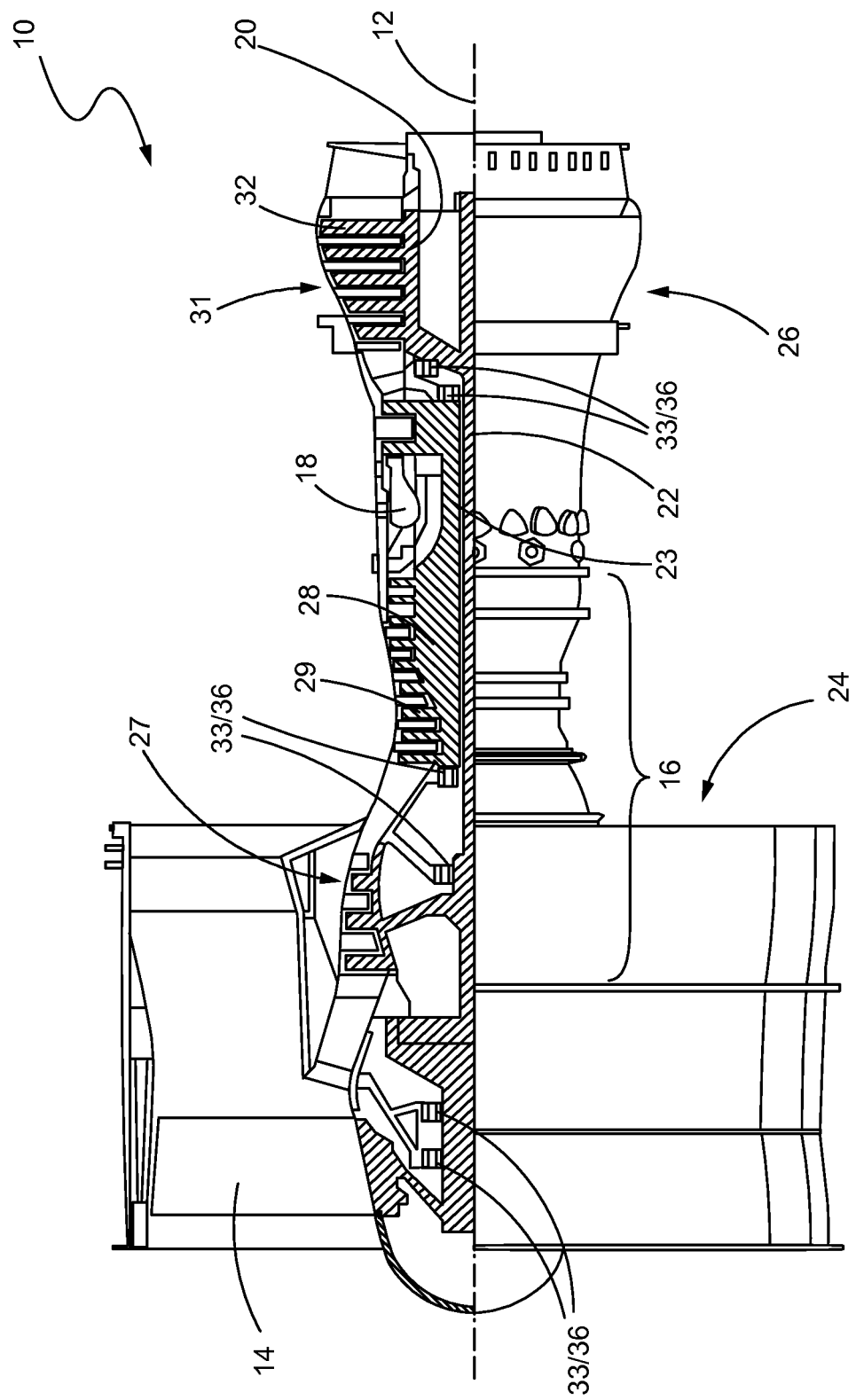
FIG. 1 is a partial sectional view of a gas turbine engine constructed in accordance with an embodiment of the present disclosure.

Referring now to the drawings, and with specific reference to FIG. 1, a gas turbine engine, depicted as a turbofan engine, is disclosed and generally referred to by numeral 10. The gas turbine engine 10 has a number of components axially aligned along a central axis 12 including, but not limited to, a fan 14, a compressor section 16 downstream of the fan 14, a combustor 18 downstream of the combustor 18, a turbine section 20 downstream of the combustor 18. As used herein, "downstream" is defined as further along the air flow path through the engine 10.

The engine 10 depicted is a dual-spool engine and thus includes a first engine shaft 22 and a second engine shaft 23. It should be understood, however, this engine is only exemplary and this disclosure may be applied to a three spool engine. The second engine shaft 23 is concentrically mounted around the first engine shaft 22, and both engine shafts 22, 23 extend through the center of the engine 10 along the central axis 12 from a forward end 24 of the engine 10 to an aft end 26 of the engine 10 connecting the fan 14, compressor 16, and turbine 20.

The fan 14 is positioned on the forward end 22 of engine 10 such that when the fan 14 is rotated by the engine shaft 22 ambient air is drawn into the engine 10. The compressor section 16 is pictured as a dual spool compressor having a low-pressure compressor 27 mechanically coupled to the first shaft 22, and a high-pressure compressor 28 mechanically coupled to the second shaft 23. The compressor section 16 includes a plurality of blades 29 extending radially outward. As the compressor section 16 rotates on the engine shafts 22, 23, ambient air drawn in by the fan 14, compressed, and forced downstream toward the aft end 26 of the engine 20. The combustor 18 is positioned downstream from the compressor 16 and accepts the compressed air 19 to be used for combustion and cooling. The air used for combustion is combined with a fuel and ignited to produce an exhaust, while the air used for cooling is used to cool the combustor 18 and then also burnt with the fuel and combustion air. The exhaust expands out of the combustor 18 and through the turbine section 20 positioned axially downstream from the combustor 18. The turbine section 20 is also depicted as a dual-spool turbine having a high-pressure turbine 30 mechanically coupled to the second shaft 23, a low-pressure turbine 31 mechanically coupled to the first shaft 22, and a plurality of blades 32 extending radially outward. The expanding exhaust from the combustor 18 causes the turbine blades 32 to rotate on the engine shafts 22, 23. The rotation of the shafts 22, 23 also cause rotation of the fan 14 and the compressor section 16. It can therefore be seen that this process is self-sustaining once it has begun.

The gas turbine engine 10 includes a plurality of engine components 33 which require a flow of lubricant 34 (see FIG. 2), such as, but not limited to, the engine shafts 22, 23 or bearings 36 for the engine shafts 22, 23. The bearings 36 require the lubricant 34 to facilitate smooth movement of the engine shafts 22, 23. The lubricant 34 may also remove heat from the bearings 36 gained from frictional contact with the engine shafts 22, 23. To facilitate the movement of the lubricant 34 to each of the engine components 33, the engine 10 has a lubrication system 38.

Figure 2:
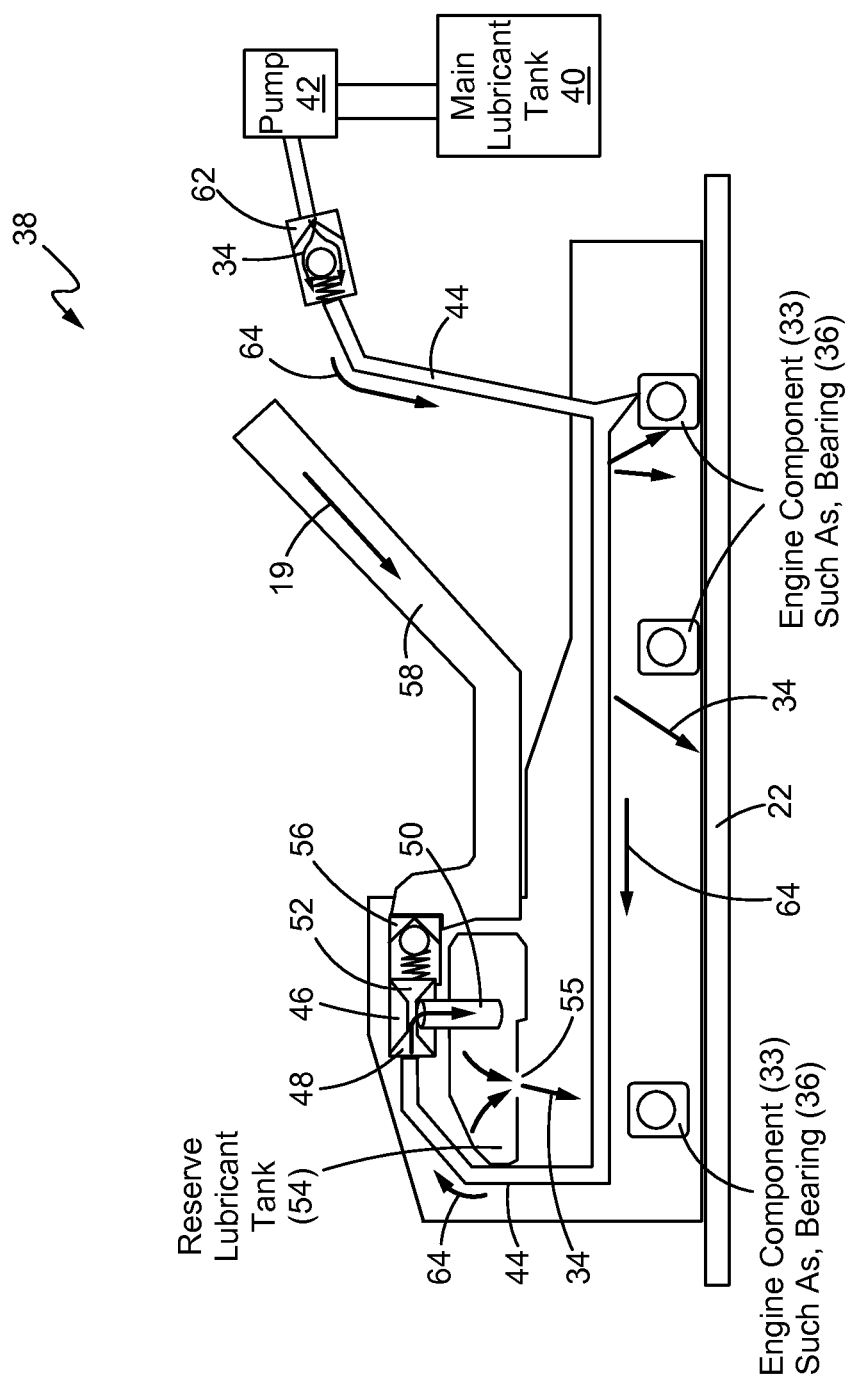
FIG. 2 is a cross-sectional view of a lubrication system constructed in accordance with an embodiment of the present disclosure and in a normal operation.

As seen in FIG. 2, the lubrication system 38 may have a main lubricant tank 40 in which the lubricant 34 can be stored when not being used. The lubrication system 38 may have a pump 42 to pump the lubricant 34 from the main lubricant tank 40 through a main conduit 44 to each of the bearings 36 (or other engine component needed lubrication). The main conduit 44 may connect to a three-way valve, such as a venturi valve 46, at a first opening 48. The venturi valve 46 may further have a second opening 50 and a third opening 52. The lubricant 34 flows from the main conduit 44 through the first opening 48 into the venturi valve 46 and out the second opening 50 into a reserve lubricant tank 54. From the reserve lubricant tank 54, the lubricant 34 flows through a lubricant jet hole 55 to the bearings 36. Thereafter, the lubricant rejoins the rest of the lubricant 34 which has been delivered to the bearings 36 by the main conduit 44. This retrieved flow of lubricant 34 from the venturi valve 46 is greater than the flow out of the reserve lubricant tank 54, and thus allows the reserve lubricant tank 54 to build and hold a fresh supply of lubricant 34 at all times. A scavenger system may also be provided to remove the used lubricant 34 from the bearings 36 and return the lubricant 34 to the main lubricant tank 40.

The third opening 52 of the venturi valve 46 may be connected to an air-check valve 56. The air-check valve 56 is pictured as a spring loaded pressure valve, however, other valves are possible. The air-check valve 56 may be biased to keep the compressed air 19, siphoned from the compressor section 16 through an air conduit 58, from entering the venturi valve 46. In alternate embodiments, the compressed air 19 may be any desired working fluid and the air-check valve 56 may be a working fluid check valve designed to operate with such a working fluid.

During a normal mode of operation of the presented lubrication system 38 in a gas turbine engine 10, the lubricant 34 flows in a first direction 64 from the main lubricant tank 40 through the main conduit 44 to the engine components 33 and to the venturi valve 46. At the venturi valve 46, the pressure of the lubricant 34 on the air-check valve 56 may be greater than the pressure of the compressed air 19 on the air-check valve 56, which keeps the air-check valve 56 closed. Thus, the lubricant 34 flows through the venturi valve 46 and into the reserve lubricant tank 54. The lubricant 34 in the reserve lubricant tank 54 may be driven out of the reserve lubricant tank 54 through the lubricant jet hole 55 to the engine components 33 by new incoming lubricant 34 from the main lubricant tank 40. The lubricant 34 in the reserve lubricant tank 54 may thereby be recycled during the normal mode of operation to keep fresh lubricant 34 in the reserve lubricant tank 54.

Figure 3:
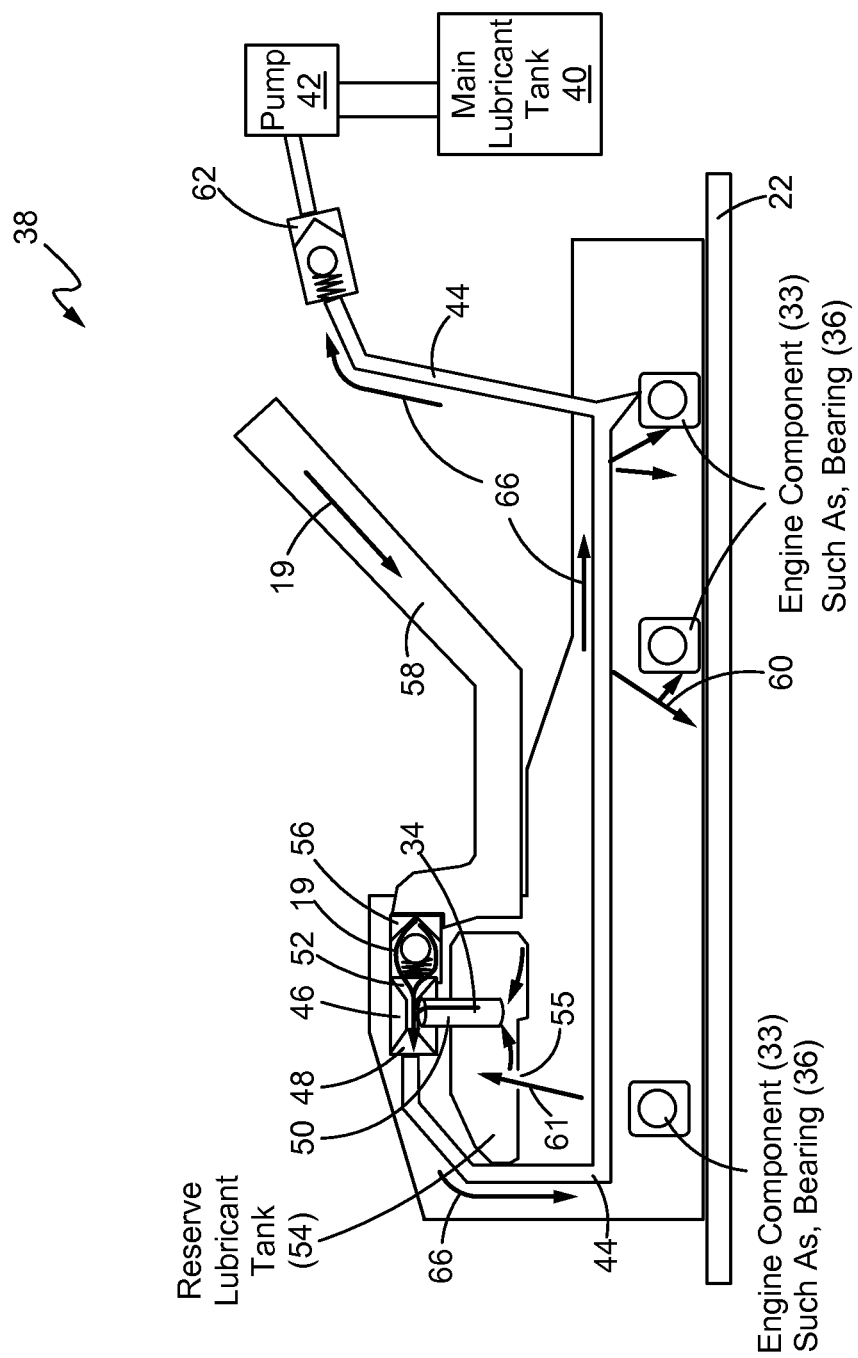
FIG. 3 is a cross-sectional view of the lubrication system of FIG. 2, but depicted in a low-lubrication-pressure operation.

The lubrication system 38 also has an auxiliary or low-lubricant-pressure mode, such as is depicted in FIG. 3. This low-lubricant-pressure mode of operation is automatically activated by the compressed air pressure on the air-check valve 56 becoming greater than the lubricant 34 pressure, which allows the air-check valve 56 to open. The compressed air 19 then flows through the venturi valve 46 from the third opening 52 to the first opening 48 and into the main conduit 44. As the compressed air 19 flows through the venturi valve 46, the compressed air 19 creates a pressure drop which draws lubricant 34 from the reserve lubricant tank 54 through the second opening 50 through the first opening 48 and into the main conduit 44. The lubricant 34 and compressed air 19 mix in the main conduit 44 and flow in a second direction 66 (opposite to the first direction 64) to the engine components 33 as an air-lubricant mixture 60. The air-lubricant mixture 60 may be expelled from the main conduit 44 as an air-lubricant mist onto the engine components 33.

Since lubricant 34 from the reserve lubricant tank 54 may not be resupplied during the low lubricant mode of operation of the lubrication system 38, an inexhaustible supply of lubricant 34 to the engine components 33 may not be available. In such an occurrence, air 61 may be drawn into the reserve lubricant tank 54 from the engine components 33 through the lubricant jet hole 55. In the case of an aircraft, this temporary supply of lubricant 34 may allow the pilot of the aircraft time to land or repair the lubrication system to return the lubrication system back to normal lubrication pressure without damage to the engine 10.

A lubricant-check valve 62 may also be positioned in the main conduit 44 between the engine components 33 and the main lubricant tank 40. The lubricant-check valve 62, pictured as a spring loaded pressure valve in FIGS. 2 and 3, may be biased to a closed position during low lubricant pressure operations, this may prevent the air-lubricant mixture 60 from entering into the main lubricant tank 40. During normal operation however, the lubricant-check valve 62 may be held open by the lubricant pressure on the lubricant-check valve 62 from the lubricant 34 flowing from the main lubricant tank 40.

In operation, the presented lubrication system 38 operates in a normal mode while normal lubricant pressure exists and automatically switches to operate in a low-lubricant-pressure mode, or auxiliary mode, when the lubricant pressure drops below a desired level as determined by the relative pressures of the lubricant 34 and compressed air 19, as well as the strength of the air-check valve 58. The auxiliary mode may utilize the same conduits as the normal mode and thereby reduce the space and weight of equipment necessary to implement the presented lubrication system 38 of the present disclosure, as composed to other lubrication systems. The lubrication system 38 may also switch automatically from the low-lubricant-pressure mode of operation to the normal mode of operation when the lubricant pressure from the lubricant 34 traveling in the first direction 64 becomes greater than the pressure of the air-lubricant mixture 60 traveling in the second direction 66. This may allow the lubricant-check valve 62 to be opened and the air-check valve 56 to be closed, which may return a flow of lubricant 34 from the main lubricant tank 40 to the engine components 33.

INDUSTRIAL APPLICABILITY

From the foregoing, it can be seen that the technology disclosed herein has industrial applicability in a variety of settings such as, but not limited to, providing a flow of lubricant to engine components for a gas turbine engine during low lubricant pressure operations. The low lubricant pressure system utilizes the same conduits which the normal lubrication system utilizes, thereby creating a lubrication system which still operates effectively without main lubricant pressure for a limited time while requiring very little additional equipment. This may be of particular benefit to aircraft where space and weight are limited.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the appended claims as well.

What is claimed is:

1. A lubrication system, comprising:
   a three-way venturi valve with a first opening, a second opening fluidly downstream of the first opening and a third opening fluidly downstream of the second opening;
   a main conduit connected to the three-way venturi valve at the first opening and communicating a lubricant in a first direction from a main lubricant tank to at least one working component and into a reserve lubricant tank connected to the three-way venturi valve at the second opening; and
   a working fluid check valve connected to the three-way venturi valve at the third opening controlling a flow of a working fluid into the lubrication system, wherein the lubrication system automatically switches to operate in an auxiliary mode when the working fluid check valve allows a flow of a working fluid into the lubrication system; and
   wherein lubricant from the reserve lubricant tank and the working fluid flows outwardly from the three-way venturi valve at the first opening in a second direction that is opposite to the first direction when the lubrication system is operating in the auxiliary mode.

2. The lubrication system of claim 1, wherein the working fluid check valve is a pressure valve biased to a closed position.

3. The lubrication system of claim 1, wherein the working fluid is compressed air.

4. The lubrication system of claim 1, further comprising a lubricant check valve positioned in the main conduit between the main lubricant tank and the three-way venturi valve.

5. The lubrication system of claim 4, wherein the lubricant check valve is a pressure valve biased to a closed position.

6. The lubrication system of claim 1, wherein the working component is a bearing of a gas turbine engine.

7. A gas turbine engine, comprising:
   a compressor;
   a combustor downstream from the compressor;
   a turbine downstream from the combustor and connected to the compressor by an engine shaft; and
   a lubrication system operatively associated with at least one of the compressor, combustor, turbine and shaft, the lubrication system including a three-way venturi valve with a first opening, a second opening fluidly downstream of the first opening and a third opening fluidly downstream of the second opening, the first opening of the three-way venturi valve connected to a main lubricant tank by a main conduit, the second opening of the three-way venturi valve connected to a reserve lubricant tank, and the third opening of the three-way venturi valve connected to an air-check valve, wherein a lubricant flows into the first opening in a first direction when the lubrication system is operating in a normal mode and wherein the lubrication system automatically switches from the normal mode to operate in an auxiliary mode when the air-check valve allows a flow of a working fluid into the lubrication system and wherein lubricant from the reserve lubricant tank and the working fluid flows outwardly from the three-way venturi valve at the first opening in a second direction that is opposite to the first direction when the lubrication system is operating in the auxiliary mode.

8. The gas turbine engine of claim 7, wherein the air-check valve is a pressure valve biased to a closed position.

9. The gas turbine engine of claim 7, wherein an air conduit provides a passage for compressed air to flow from the compressor to the air-check valve.

10. The gas turbine engine of claim 7, further comprising a lubricant-check valve positioned in the main conduit between the main lubricant tank and the three-way venturi valve.

11. The gas turbine engine of claim 10, wherein the lubricant-check valve is a pressure valve biased to a closed position.

* * * * *